Feb. 1, 1927.

A. R. PURDY 1,616,064

INTERNAL COMBUSTION ENGINE

Filed March 25, 1924    3 Sheets-Sheet 1

INVENTOR.
BY
ATTORNEY.

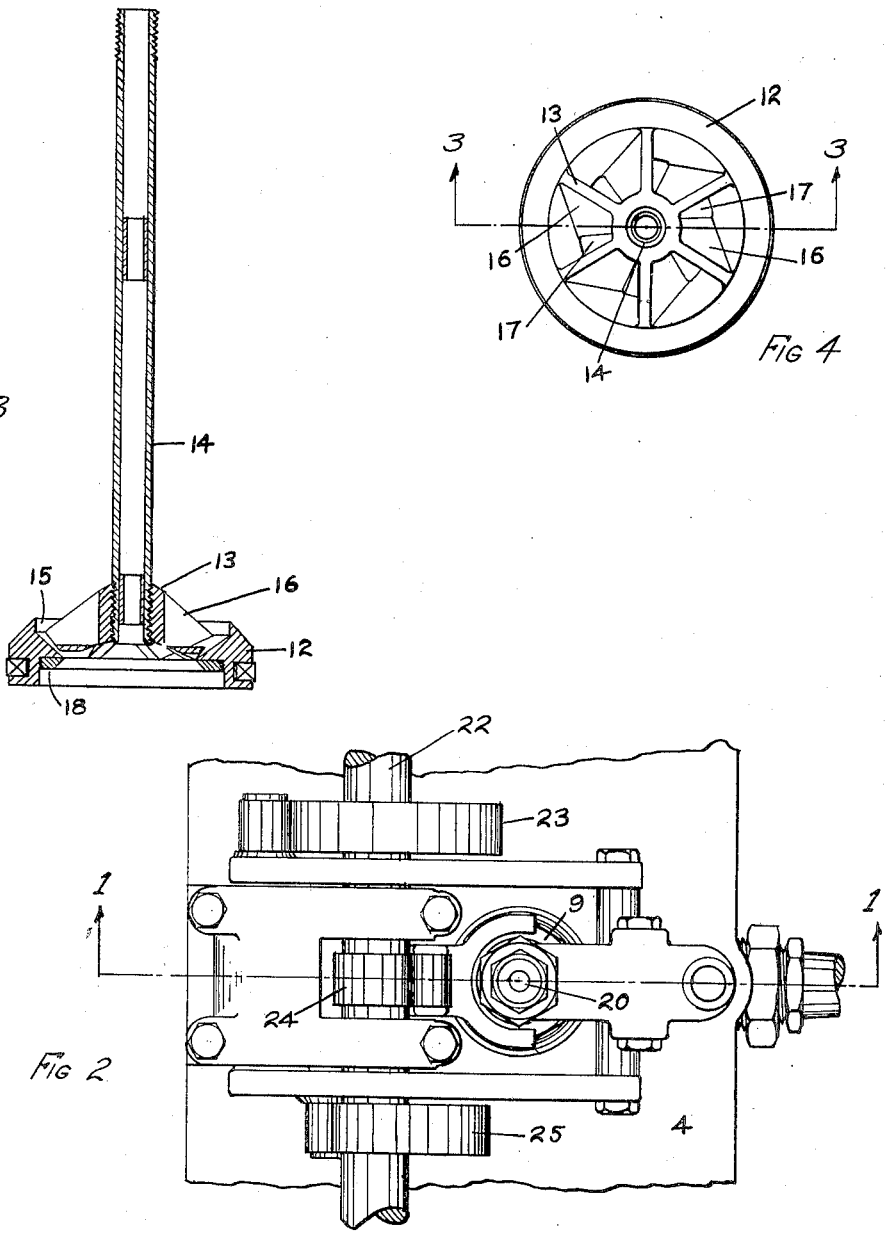

Patented Feb. 1, 1927.

1,616,064

UNITED STATES PATENT OFFICE.

ASA ROBERT PURDY, OF BOUNDBROOK, NEW JERSEY.

INTERNAL-COMBUSTION ENGINE.

Application filed March 25, 1924. Serial No. 701,686.

This invention relates to internal combustion engines or motors.

One object is to provide an internal combustion engine of increased power and efficiency.

Another object is to provide an engine in which a four-cycle operation is carried out during each single complete revolution of the main shaft, thereby doubling the power output per revolution without increasing the over-all length or increasing the weight.

A further object is to provide the working cylinder with a valved piston in addition to the ordinary power piston, which valved piston functions at and during the completion of the downward or working stroke of the power piston to expel the burnt charge and simultaneously to draw in the succeeding charge, and during the upward or compression stroke of the power piston to transfer the charge from the space above the valved piston to the space below said piston.

A still further object is to provide a valved piston which is so shaped as to produce an accelerated turbulent whirling action of the combustible charge during its transference and up to the moment of explosion, thereby preventing disintegration of the charge, particularly at slow revolutions.

An additional object is to provide an intake valve which opens prior to the beginning of the charging stroke of the valved piston so as to give free access to the flow of combustible charge into the cylinder.

The foregoing and other objects are attained by means of the construction and arrangement of parts hereinafter described and claimed, it being understood that modifications may be made therein without departing from the scope of the invention.

In the accompanying drawings illustrating one form of the invention—

Fig. 2 is a top plan view of the cylinder head and valve gear;

Fig. 3 is a vertical section of the valved piston;

Fig. 4 is a top plan view of the valved piston;

Figure 7:
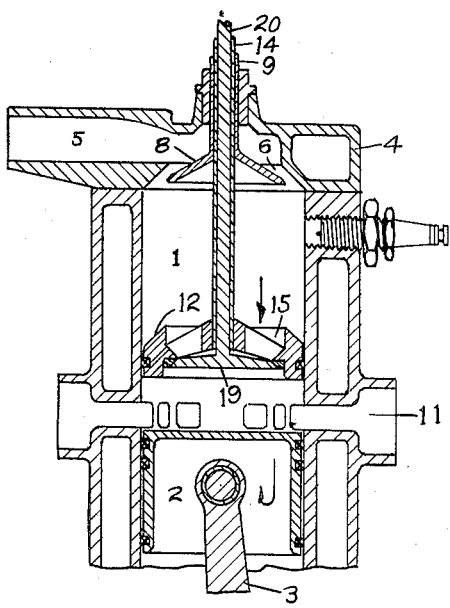
Figure 8:
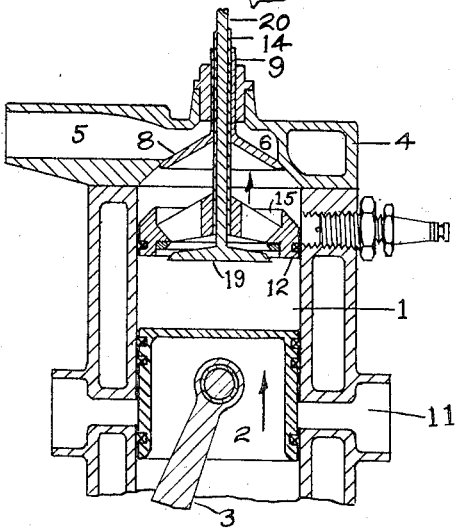

Fig. 7 is a further view showing the power piston at about the completion of its working stroke, with the intake valve opened, the exhaust ports uncovered, and the valved piston traveling downward to expel the burnt charge from below its lower face and simultaneously to draw a fresh charge into the space above its upper face; and, Fig. 8 is another view showing the power piston at an intermediate position during the compression stroke, with the intake valve closed, and the valved piston traveling upward and having its valve opened to permit transference of the charge being compressed from the space above the upper face of the valved piston to the space below the lower face thereof.

Referring now to the drawings, 1 indicates a conventional form of engine cylinder. Working in the cylinder is a power piston 2 of usual construction, which piston is connected by a rod 3 with the crank shaft (not shown).

The cylinder head 4 is provided with a passage 5 leading to an intake port 6 having a conical face 7 forming a seat for the intake poppet-valve 8. The valve has a stem 9 and is normally held tightly against its seat by a spring 10. In its preferred form the stem 9 is concentric with and surrounds the hollow rod 14 of the valved piston 12.

Preferably, though not necessarily, the intake port 6 is aligned with the cylinder axis, thus affording a supply opening of largest area for rapidly admitting the charge to the cylinder. Exhaust ports 11, of sufficient number or area to permit of rapid evacuation of the burnt charge, are formed in the wall of the cylinder in such position as to be fully uncovered by the power piston 2 at about the end of its working stroke, as seen in Fig. 7.

Figure 6:
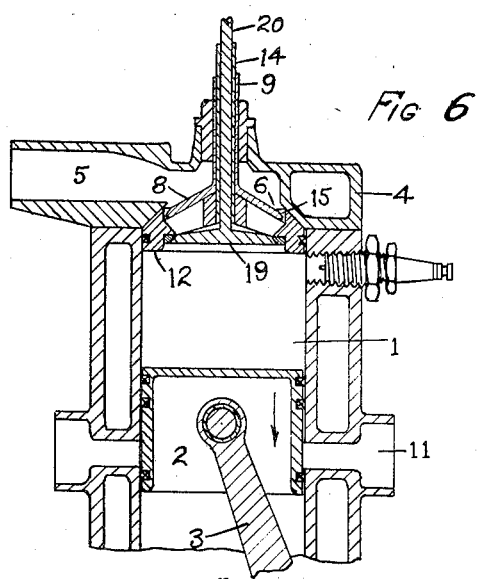
Fig. 6 is a similar view showing the power piston at an intermediate position during expansion of the charge, with the valve piston still at its upper extreme position and the intake valve opened.

The valved piston 12 has a spider body portion 13 connecting it to the hollow actuating rod 14. The top of piston 12 preferably has a depression or recess 15 into which the intake poppet-valve 8 lowers, as seen in Fig. 6, to open the intake port prior to the downward stroke of the valved piston. The upper outer edge of the valved piston may be beveled, as shown in Fig. 3, to fit against the conical face 7 of the intake port.

The radial arms of the spider 13 are preferably formed with parallel inclined walls to provide inclined vanes 16 that produce a whirling motion of the charge in passing through the openings 17 between adjacent arms.

The valved piston is provided with a seat 18 for the disk or poppet valve 19 having a stem 20 that slides in the bore of the piston-rod 14. The valve 19 normally closes the openings 17 and is held against its seat by a spring 21.

I shall now describe a cycle of operation of the engine assuming the charge to have been compressed in the previous cycle.

Figure 1:
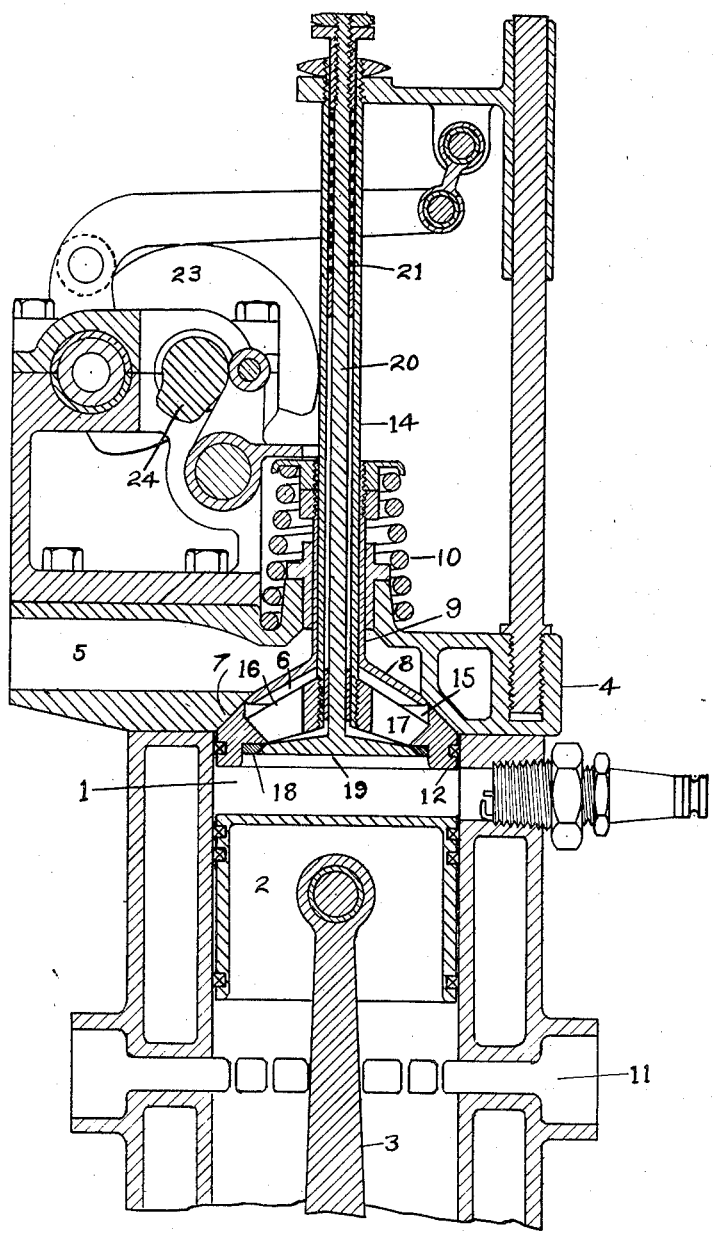
Figure 1 is a vertical section of the cylinder and valve gear.
Figure 5:
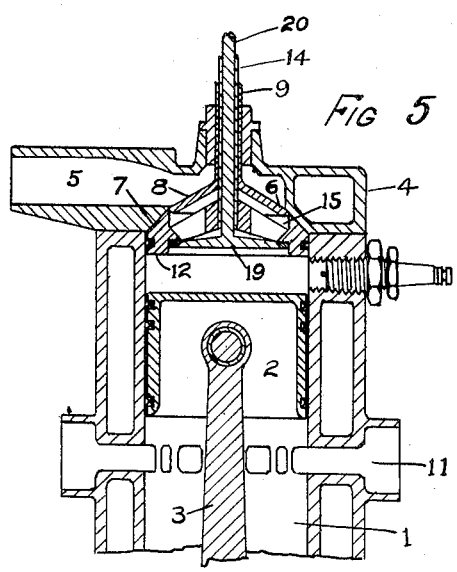
Fig. 5 is a vertical section of the cylinder with the intake valve closed, showing the position of the valved piston and the power piston at the time of ignition or explosion of the charge and the beginning of the working stroke.

At the moment of ignition of the charge the intake valve 8 is closed, and both the power piston 2 and the valved piston 12 are at their uppermost positions, as shown in Fig. 5. As the power piston 2 descends on its working stroke, and while the valved piston 12 is still in its uppermost position, the intake valve 8 opens, as seen in Fig. 6, to permit of drawing a fresh charge into the cylinder immediately on descent of the valved piston. During completion of the working stroke and commencement of the return stroke the power piston 2 first uncovers and then again covers the exhaust ports 11. In the interval while the working piston is traveling from about half way down to a little over half way up again, the valved piston 12 makes a complete downward and upward stroke. During the downward stroke the poppet valve 19 remains closed, as shown in Fig. 7, and said valved piston operates to expel the burnt charge from below its lower face through the exhaust ports, and simultaneously to draw a fresh charge into the cylinder in the space above its upper face. On the upward stroke of the valved piston the intake valve 8 closes, and the poppet valve 19 opens, as seen in Fig. 8, to allow the charge to pass into the space below the valved piston and to be compressed by the power piston on its return or compression stroke. At the completion of the upward stroke of the valved piston the poppet valve 19 again closes, thereby completing the cycle and returning the parts to their initial positions, shown in Fig. 5, ready for the succeeding cycle.

On the upstroke of the valved piston the poppet valve 19 opens automatically by reason of the fact that the pressure of the charge in the space above the valved piston, during upward movement of said piston, becomes greater than the tension of the calibrated spring 21 which normally holds the valve seated. I do not, however, restrict my invention to a self-opening valve.

It will be observed that by forming the cylinder with exhaust ports of large area, and by providing an unusually large intake port and a valved piston having a rapid but delayed downstroke with respect of the working stroke of the power piston, the burnt charge can be more completely evacuated, while at the same time the full quantity of fresh charge required for the succeeding cycle can be drawn quickly into the cylinder.

Any suitable mechanism may be employed to operate the several moving parts in the sequence and time relationship hereinabove described. One form of such mechanism is indicated in the drawings, and includes a shaft 22 carrying cams 23 and 25 for operating the valved piston 12, and a cam 24 for operating the intake valve 8. It is to be understood that I do not in any wise limit the invention with respect to the particular mechanisms or instrumentalities used to effect movement of the valved piston and the valves, and, therefore, I have not described the same in detail.

What I claim is:

1. A two-stroke four cycle internal combustion engine comprising a cylinder, a working piston, an intake port, an intake valve normally closing said port, an exhaust port alternately covered and uncovered by the working piston, a valved piston having an axial passage, a valve in the valved piston normally closing the passage, means for opening the intake valve on descent of the valved piston, and means for moving the valved piston downward with its valve closed at about the end of the working stroke of the working piston and for returning said valved piston with its valve opened during the compression stroke of the working piston.

2. A two-stroke four cycle internal combustion engine comprising a cylinder, a working piston, an intake port, and intake valve normally closing said port, an exhaust port alternately covered and uncovered by the working piston, a valved piston having an axial passage, a valve in the valved piston normally closing the passage, means for opening the intake valve prior to descent of the valved piston and maintaining it open during such descent, and means for moving the valved piston downward with its valve closed at about the end of the working stroke of the working piston and for returning the valved piston with its valve opened during the compression stroke of the working piston the movements of the valved piston being rapid in comparison with the corresponding movements of the working piston.

3. A two-stroke four cycle internal combustion engine comprising a cylinder, a working piston, an intake port in the cylinder head concentric with the cylinder axis, an intake valve normally closing said port, an exhaust port in the cylinder wall alternately covered and uncoverd by the working piston, a valved piston having an axial passage, a valve in the valved piston normally closing the passage, means for opening the intake valve prior to descent of the valved piston and maintaining it open during such descent, and means for moving the valved piston downward with its valve closed at about the end of the working stroke of the working piston and for returning said valved piston with its valve opened during the compression stroke of the working piston.

4. In an internal combustion engine, the combination with the cylinder and the working piston, of a valved piston having an axial passage, a valve in the valved piston normally closing the passage, and means for moving the valved piston downward with its valve closed on the working stroke of the working piston and for returning the valved piston with its valve opened on the compression stroke of the working piston.

5. In an internal combustion engine, the combination with the cylinder and the working piston, of a valved piston having an axial passage, a valve in the valved piston normally closing the passage, and means for moving the valved piston downward with its valve closed on the downstroke of the working piston and for returning the valved piston on the upstroke of the working piston, the movements of the valved piston being rapid in comparison with the corresponding movements of the working piston.

6. In an internal combustion engine, the combination with the cylinder and the working piston, of a valved piston having an opening through its opposed faces, a valve seated on the valved piston and covering said opening, and means for moving the valved piston downward with its valve seated on the working stroke of the working piston and for returning the valved piston with its valve unseated on the compression stroke of the working piston.

7. In an internal combustion engine, the combination with the cylinder, of an intake valve in the upper end end of the cylinder, a valved piston having a plurality of inclined passages therethrough, means for reciprocating said piston, and a valve in said piston closing the passages thereof on the downstroke and opening said passages on the upstroke, whereby to permit passage of the charge from the space above to the space below the valved piston on its upstroke and to impart a whirling motion to the charge.

8. In an internal combustion engine, the combination with the cylinder and the working piston, of a valved piston operating in the cylinder to eject the burnt charge from below its lower face simultaneously to draw a fresh charge into the space above its upper face during the latter part of the working stroke of the working piston, and to transfer the charge from the space above to the space below the valved piston during the compression stroke of the working piston.

9. In an internal combustion engine, the combination with the cylinder and the working piston, of an intake port in the cylinder head concentric with the cylinder axis, a valve seat in the cylinder head surrounding said port, an intake poppet-valve seated thereon, a hollow stem extending upward from said valve through the cylinder head, a spring acting on the stem to maintain the intake valve normally seated, a valved piston having an opening therethrough, a hollow piston rod extending from said piston through the hollow stem of the intake valve, a valve seat in the lower face of the valved piston surrounding the opening thereof, a disk valve seated thereon, a stem on said disk valve extending through the hollow piston rod, and a spring acting on the stem of the disk valve to maintain it normally seated.

ASA ROBERT PURDY.